US006762385B1

(12) United States Patent
Kowalik et al.

(10) Patent No.: US 6,762,385 B1
(45) Date of Patent: Jul. 13, 2004

(54) ARC EXTINGUISHING DEVICE WITH A HIGH SPEED WHIP

(75) Inventors: Peter M. Kowalik, Trafford, PA (US); Joseph K. Andreyo, North Huntingdon, PA (US); Arthur E. Bisig, North Huntingdon, PA (US); Charles M. Cleaveland, North Huntingdon, PA (US)

(73) Assignee: Cleaveland/Price Inc., Trafford, PA (US)

( * ) Notice: Subject to any disclaimer, the term of this patent is extended or adjusted under 35 U.S.C. 154(b) by 0 days.

(21) Appl. No.: 10/342,035

(22) Filed: Jan. 14, 2003

(51) Int. Cl.[7] .................................................. H01M 9/38
(52) U.S. Cl. ............................................ 218/18; 218/14
(58) Field of Search ............................ 218/18, 14, 2–8, 218/12, 78, 84, 43, 67, 71, 153, 154

(56) References Cited

U.S. PATENT DOCUMENTS

| | | | | | |
|---|---|---|---|---|---|
| 2,750,460 | A | * | 6/1956 | Kast | 200/48 A |
| 2,769,063 | A | * | 10/1956 | Lingal | 218/12 |
| 2,849,578 | A | * | 8/1958 | Hart | 218/12 |
| 2,873,325 | A | * | 2/1959 | Kelly | 200/48 R |
| 3,005,063 | A | * | 10/1961 | Zellers et al. | 200/48 SB |
| 3,032,632 | A | * | 5/1962 | Beach et al. | 218/84 |
| 3,217,115 | A | | 11/1965 | Kaplan | |
| 3,244,825 | A | * | 4/1966 | Killian et al. | 200/48 CB |
| 3,862,509 | A | * | 1/1975 | Petersen, Jr. | 43/17.5 |
| 3,955,303 | A | * | 5/1976 | Outlaw et al. | 43/19.2 |
| 4,080,643 | A | * | 3/1978 | Cline | 361/218 |
| 4,170,014 | A | | 10/1979 | Sully | |
| 4,243,854 | A | | 1/1981 | Pahl | |
| 4,860,481 | A | | 8/1989 | Christenson | |
| 4,945,333 | A | | 7/1990 | Stroud et al. | |
| 5,186,315 | A | | 2/1993 | Koppe et al. | |
| 5,359,167 | A | | 10/1994 | Demissy et al. | |
| 5,369,234 | A | | 11/1994 | Demissy | |
| 5,728,988 | A | * | 3/1998 | Meinherz et al. | 218/65 |
| 6,392,181 | B1 | | 5/2002 | Cleaveland et al. | |

* cited by examiner

*Primary Examiner*—Elvin Enad
*Assistant Examiner*—M. Fishman
(74) *Attorney, Agent, or Firm*—Gordon H. Telfer

(57) ABSTRACT

Rapid arc extinguishing devices for air break switches have a whip with at least an end portion of nonmetallic material such as fiber reinforced plastic with a conductive path on its surface. The nonmetallic material is a single tapered rod or an assembly of a plurality of rods successively inserted into an outer rod. The conductive path on the whip is of various individual and combination forms of which some include a metal braid, foil, sheath or wound wire. Particular forms of the conductive path on the rod have enhanced durability and arc resistance at the areas of the whip most likely to be subject to arcing with a latch of the device upon switch opening or closing. Further forms of the whip are a combination in which an end portion as described is attached to an all metal base portion that is arranged to include a portion of the whip subject to arcing on switch closing. Another form of device has a latch engaging a whip at a rotating wheel on the latch.

13 Claims, 6 Drawing Sheets

ARC EXTINGUISHING DEVICE WITH A HIGH SPEED WHIP

BACKGROUND OF THE INVENTION

1. Field of the Invention

This invention relates to arc extinguishing devices for electrical switchgear such as air break disconnect switches used in transmission and distribution lines.

2. Related Art

U.S. Pat. No. 6,392,181, May 21, 2002, also assigned to Cleaveland/Price Inc., describes relevant background concerning use of high speed whips of all metal construction in arc extinguishing devices of switches and further describes such apparatus with whips comprising a nonmetallic material , such as a plastic polymer member, with a flexible conductive path. The patent describes embodiments capable of achieving faster separation (with less chance of arc restriking) of a whip with nonmetallic material as compared to an all metal whip that is otherwise similar.

All such description of the patent related to all metal whips of the background art and, also, whips with nonmetallic material newly presented in the patent, is incorporated herein by reference.

SUMMARY OF THE INVENTION

The present invention is directed to apparatus generally like that of the above-mentioned patent, with a whip comprising a nonmetallic material, such as a plastic polymer, with a flexible conductive path, with newly disclosed embodiments of the whip itself and, in addition, of the latch or hook element that the whip makes conductive contact with during initial main contact separation.

Some of the various example embodiments of the invention include one or more of the following innovative features.

A whip in one form comprises a plurality of tapered nonmetallic rods that fit inside one another. For example, a first hollow rod has one or more additional tapered rods telescopically fit together inside the first rod forming a rod assembly. At least all but the final, inner rod is hollow. Only the outer-most rod needs to be provided with a conductive path. The plurality of rods can be of the same nonmetallic material and have the same taper dimensions. Fitting the rods together only requires a second rod to be inserted in the first rod to the extent the first and second rods dimensions allow, generally with the tip of the second rod at least halfway through the length of the first, and the tip of a third, if any, at least halfway through the second. Most often the extent of the inserted rod is about 75% to 90% through the length of the adjacent outer rod. The assembled rods are terminated at a common blunt end. In some embodiments three or four rods have been so assembled and have exhibited good characteristics but the number of rods may be varied.

An assembly of multiple rods as described is considered to perform similar to a leaf spring with an increase in accelerating force, compared to use of a single rod like the first rod of the assembly, while still retaining flexibility. The multiple rods also can be more resistant to breakage than a single unitary rod of the same overall dimensions as the multiple rods.

Such an assembly of multiple rods is provided with a conductive path for engaging with a latch of an arc extinguishing device such as described in the above patent and in other descriptions below. For example, the outer surface of the first rod has some from of a conductor layer on it.

The conductive path on the outer rod of the rod assembly (or a single rod where only one is used) can be formed in numerous different ways to achieve desired conduction between the whip and the latch and between the latch contact point and the attachment of the whip to the switch contact arm, all while the nonmetallic rod supporting the conductive path still retains substantial flexibility so it can provide higher separation speed from the latch.

The forms described herein for the conductive path on the nonmetallic rod include, for example, at least one conductor selected from the group consisting of a metal braid (e.g., tubular metal braid held to the rod by its own elasticity), a metal foil (e.g., a wrapping of an adhesive backed thin foil layer), a metal sheath (e.g., a conductive tubular element into which the nonmetal rod fits securely), and a wound metal wire. Various examples, including combinations of some of the foregoing conductors, will be described, of which some are particularly designed to enhance the durability of the conductive path where arcing is initiated between the whip and the latch upon switch closing and also at the tip of the whip that finally separates from the latch.

Among embodiments of the invention are those in which a nonmetallic portion of a whip, such as a rod assembly with the multiple rods above described or a single nonmetallic rod, is assembled with an all metal base portion with the metal portion extending, for example, from a point of connection on a switch contact arm to a point above an area on the whip at which it first conducts when the switch contacts open and also where it first has a close air gap with the latch during switch closing. In such embodiments, the metal base portion can be like the base part of the prior art all metal whips. A whip with an all metal base can allow repeated switch operations with as much durability as prior whips entirely of metal. The whip portion with a nonmetallic rod plus a conductive path at the tip end of the whip can give favorable separation speed of the whip from the latch to minimize arcing on switch opening. The metal base portion can also contribute to increasing the separation speed by storing spring force during flexing of the whip.

A further feature of the invention involves a modification of the latch of the device so it has a wheel that engages the whip during part of a switch opening. The rolling wheel surface is the final release point for the whip from the latch. It can reduce the sliding wear between the latch and the conductor on the whip surface.

These and other aspects of the present invention will be further understood from the entirety of the description, drawings and claims.

DETAILED DESCRIPTION OF THE INVENTION

Figure 1A:
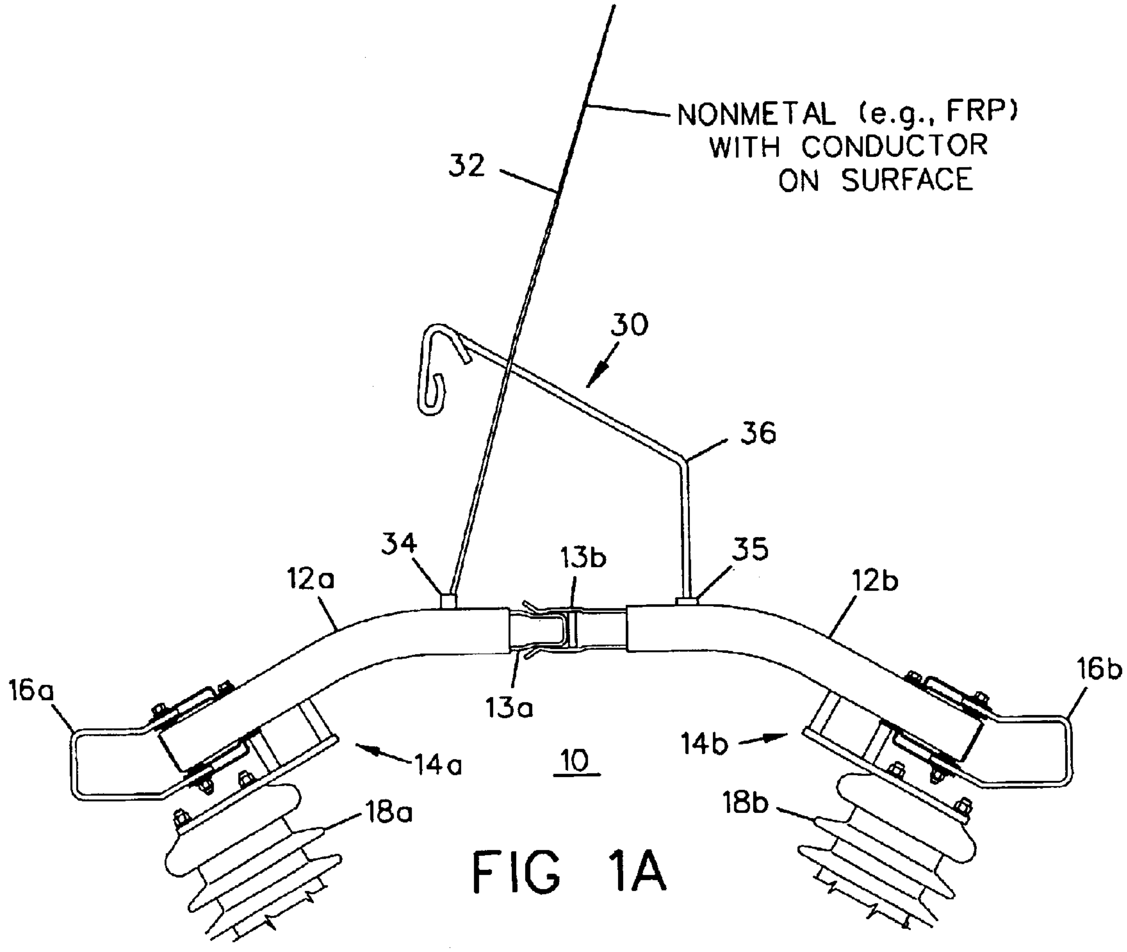
FIG. 1A is a front elevation view, partly broken away, of a switch with an arc extinguishing device.
Figure 1B:
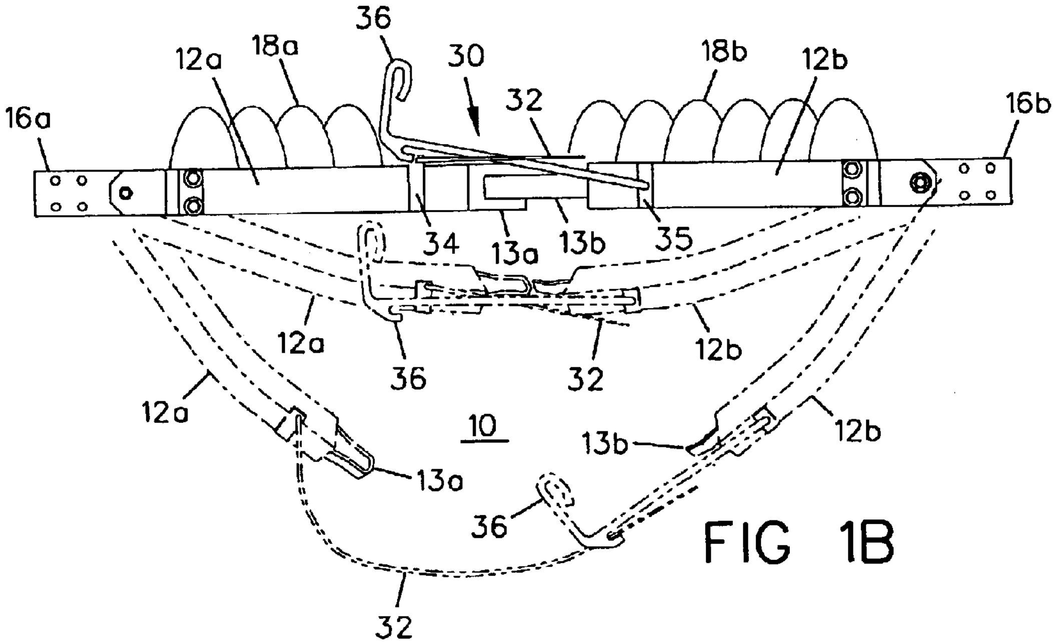
FIG. 1B is a top view of the apparatus of FIG. 1A with certain parts shown in phantom at positions resulting from movement during switch operation.

FIGS. 1A and 1B show an air break switch 10 incorporating a general form of the present invention for a general orientation of some key elements of an example switch to which the invention can be applied. The switch 10 is one referred to as a center break switch. FIG. 1A and the solid line view of FIG. 1B show the switch 10 in its closed position. Some elements of the switch 10 include, substantially in accordance with prior art:

- a pair of movable switch arms 12*a* and 12*b;*
- contacts 13*a* and 13*b* on the respective arms 12*a* and 12*b* where, when switch 10 is closed, contact 13*a* fits within and engages contact 13*b* that is jaw-like;
- pivotal or hinge-like arm supports 14*a* and 14*b* for the respective arms;
- line terminals 16*a* and 16*b* respectively conducively connected to the switch arms 12*a* and 12*b* near the arm supports 14*a* and 14*b;*
- insulators 18*a* and 18*b* respectively supporting each half of the switch 10; and
- a switch operating mechanism (not shown) that is arranged at the lower ends of the insulator supports 18*a* and 18*b* to produce rotational motion of the supports 18*a* and 18*b* and the elements they support.

The basic elements of the switch 10 can, for example, be in accordance with prior air break switches such as a "V" Configuration Center Break Switch as described in Cleaveland/Price Bulletin DB-126A02 (issued 2002). The invention may also be practiced with other air break switches such as a center break switch with parallel (rather than "V" configured) support insulators as described in that Bulletin and, also, a vertical break switch as described in Cleaveland/Price Bulletin DB-106BH97 (issued 1997) both of the referred to Bulletins are herein incorporated by reference for their description of such switches.

FIGS. 1A and 1B also show a rapid arc extinguishing device 30, a type of device sometimes referred to in the art as a "quick break whip" (although it includes more than a whip alone).

The device 30 includes a whip 32 and, in this example, an attachment (e.g., a clamp) 34 fastening the whip 32 at its lower end to the arm 12*a* The device 30 also includes a latch (or hook) 36 conducively joined by a latch attachment 35 with the arm 12*b*. In this example, the latch 36 includes a rod extending up with a bend and with a loop portion at the free end. That represents a general form for the latch 36. Further discussion of forms of the latch 36 will be found below.

By the present invention, and also consistent with the above-mentioned U.S. Pat. No. 6,392,181, the geometry of the elements of the device 30, and their relation to the rest of the switch 30, can be generally like prior "quick break whips" but with a difference in the structure of the whip 32 itself from formerly used all metal whips. In FIG. 1A, the whip 32 is accompanied by a legend designating it as a whip with a conductor on a nonmetal (e.g., plastic or fiber reinforced plastic, commonly referred to as FRP). As will be seen in subsequent drawings and description, the entire whip 32 can have that kind of structure but it has most important effect at the tip end of the whip. Consequently, some embodiments to be discussed have a tip portion of a nonmetal with a surface conductor while a basic portion of the whip is different, e.g., by being of all metal.

During an opening of the switch 10, by the mechanism associated with the support insulators 18*a* and 18*b*, the arms 12*a* and 12*b* swing toward the viewer, relative to their orientation in FIG. 1A, as represented by the phantom views of FIG. 1B. In the first phantom view of FIG. 1B, the contacts 13*a* and 13*b* have just slightly parted. Under power, a substantial amount of deleterious arcing could occur between the contacts 13*a* and 13*b* if the arc extinguishing device 30 is not present. However, the contact between the whip 32 and the latch 36, which is a rubbing or sliding conductive engagement, can avoid an arcing problem between the contacts 13*a* and 13*b*, with arcing directed to the whip and latch.

In the second phantom view of FIG. 1B, the contacts 13*a* and 13*b* are now well apart and reasonably safe from arcing. Electrical conduction is still occurring between the whip 32 and the latch 36 and the whip 32 has flexed into a curved shape with increasing spring force. Upon further movement of the arms 12*a* and 12*b* (not shown), the whip 32 separates from the latch 36 and rapidly separates due to the stored spring force. Arcing that may occur between the tip end of the whip 32 and the latch 36 can be more rapidly extinguished, due to the high speed of separation, than with a prior art whip entirely of metal.

Normally in arc extinguishing devices 30 like that of FIGS. 1A and 1B, the whip 32 and latch 36 are conducively engaged even in the closed, stationary position and remain engaged until the whip is released from its flexed position. Minimal arcing normally occurs during opening of the switch before the whip releases. Upon switch closing a portion of the whip 32 removed from the tip end makes initial arcing contact with the latch 36. The intersection of the whip 32 and latch 36 depicted in FIG. 1A gives an idea where arcing on closing is likely to occur. More on that aspect of the whip's operation will be discussed later.

Switch 10 is of course merely an example of an air break switch with an arc extinguishing device 30 having an improved whip 32. Generally, such a device 30 can be adapted to any switch whose operation can present arcing problems, at least to the same extent as prior metal "quick break whips". The above referred to product bulletins show examples of other switches. In a vertical break switch there is, as shown in the above-mentioned patent, normally one movable contact arm, having a whip attached to it, and a latch attached to a stationary contact.

As indicated on FIG. 1A, the whip 32 has a structure of a nonmetal with a surface conductor. The nonmetal can be principally some member of the general class of material known as fiber reinforced plastic (often referred to as FRP). Such materials are readily available in a variety of forms. For general information on such material and its manufacture, see, for example, "FRP Materials, Manufacturing Methods and Markets" in Composites Technology, 2002 Yellow Pages, pages 6–17, June 2002, which is herein incorporated by reference for its description of such materials and techniques related to them. More generally, however, other nonmetallic material having the flexibility and strength for achieving good separation speeds, especially those superior to metal, can be used in the whips of the invention, e.g., other plastics (or polymers) that are not fiber reinforced or even other nonmetallic materials that are not plastic. Therefore, in the description of the improved whips, the nonmetallic material of the whip may be understood as suitably FRP but without being limited to FRP.

In the drawings, similar elements will normally have the same last two digits.

Figure 2A:
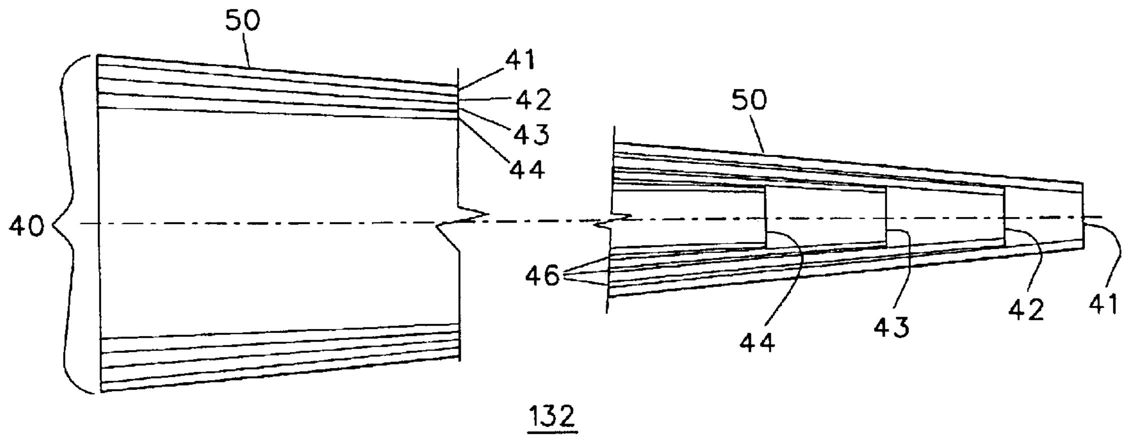
FIG. 2A is an enlarged sectional view, partly broken away, of a whip for an arc extinguishing device.

FIG. 2A (along with the partial blow-up of FIG. 2B) shows an example of a whip 132 whose entire length has a rod assembly 40 of a plurality of flexible nonmetallic rods 41, 42, 43, and 44 fit together by being-inserted inside one another. In this example, each of the four rods 41, 42, 43 and 44 have the same dimensions except their length, as will be described. At least from their tip ends (at the right in FIG. 2A) back a distance (to the left), the rods all have the same taper, wall thickness and cross-section. That fact limits the extent to which one rod can be inserted inside another. The rods 41, 42, 43 and 44 are all hollow and tapered. Starting with the first, outer, rod 41, a second rod 42 is inserted within rod 41 substantially as far as it will go, i.e., until the wall of rod 42 is impeded by the wall of rod 41. Likewise, a third rod 43 is inserted in the second rod 42 and a fourth rod 44 is inserted in the third rod 43.

In forming the rod assembly 40, the order of the insertions can be varied from the above, e.g., first insert the fourth rod 44 into the third rod 43, then that combination into the second rod 42, etc. In any case, when assembled, the inserted rods 42, 43, and 44 all end proximate the blunt end of the first, outer rod 41 (by either starting with the same length for all the rods prior to the insertions and cutting the assembly at the desired length after the insertions or cutting individual rods prior to the insertions so their length is correct afterward). At the blunt end of the rod assembly 40, all the rods are in direct contact, providing enhanced strength. At the tip end of the rod assembly, all the tip ends of the rods are spaced from each other.

Figure 2B:
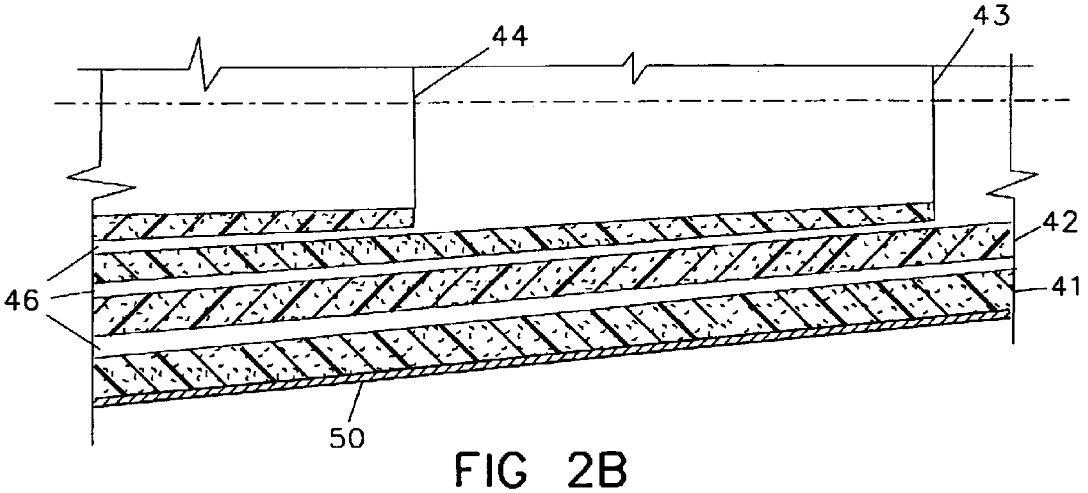
FIG. 2B is an enlarged view of part of the whip of FIG. 2A.

FIGS. 2A and 2B shows a conductor 50 on the outer surface of the outer rod 41. The conductor 50 is the conductive path between the tip of the rod 41 and its blunt end that is attached to a switch contact arm (e.g., arm 12*a* in FIG. 1). Conductor 50 can take any of a variety of forms including, for example, those subsequently described herein and those described in the above patent:

A rod assembly of multiple rods for the whip 132 need not consist of four rods, for example two or three rods, or even more than four rods might be used in some embodiments.

It has been found that a multiple rod assembly, such as assembly 40, can increase the speed of a whip with reduced chance of breakage as compared to a whip with just one rod (such as rod 41). An explanation, although not necessary to the successful practice of this aspect of the invention, is that the addition of the mass of the conductor 50 reduces the whip speed compared to the speed of a single rod without a conductor but that reduction in speed is offset by an inserted rod or rods. It is believed the rod assembly 40 acts much like an automotive leaf spring, still exhibits a high degree of flexibility, increases the accelerating force on the tip of the outer rod 41 and is strong and less likely to break than a single rod of the same wall thickness as the multiple rod assembly. A multiple rod assembly 40 allows a wide choice of the conductor 50. The strength of rod assembly 40 can facilitate supporting a heavier conductor for good arc resistance.

Example dimensions for a single rod given in the above patent are also relevant in the embodiments here, such as for rod 41, 42, 43 or 44. With a multiple rod assembly, the extent of an inserted rod is likely to be about 750% to about 90% of the distance to the tip of the next adjacent outer rod, where the rods have the same basic dimensions.

While it is not presently preferred to have a variety of rod shapes in the rod assembly 40, requiring a multiplicity of different parts to be procured, the intention is not to preclude that possibility. Likewise, it is convenient, but not essential, that the multiple rods all have the same nonmetallic material composition. Also, it is evident that the innermost rod of the assembly, the fourth rod 44 in FIG. 2, need not be hollow.

In FIGS. 2A and 2B, it is seen that the assembly 40 of substantially uniform rods 41, 42, 43, and 44 leaves gaps 46 between adjacent rods (except where direct contact is made at the blunt ends). The gaps 46 need not be filled but can be (partially or fully), for example, if desired to achieve a greater strength assembly with some sacrifice in flexibility, such as with an epoxy resin.

Figure 3:
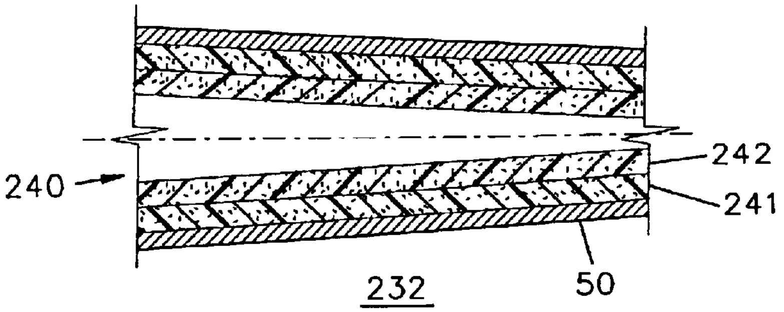
FIG. 3 is a partial sectional view of another whip embodiment.

A further variation is shown in FIG. 3 where a whip 232 comprises a rod assembly 240 of rods (just two in this example but there could be other numbers) where a second rod 242 fits within a first rod 241 (having conductor 50 on its outer surface) without leaving an appreciable gap, that is, the second rod dimensions are different than the first rod's such that it fits within rod 241 with near congruence between its outer surface and the inner surface of the first rod. Sliding between the rods 241 and 242 can occur as the whip is bent, where there is no adhesive between the two rods.

The conductor 50 has characteristics to allow the nonmetallic rods of a multiple rod assembly, or a single rod, to have a conductive path along its length while retaining a substantial flexibility. Also, the conductor 50 is chosen to withstand numerous instances of arcing that will inherently occur in operation, at least at certain areas along its length.

Referring again to FIGS. 1A and 1B, there are two key areas along the length of the whip 32 where good arc resistance is particularly important. One is where the whip surface is closest to the latch 36 upon closing of the contacts 13*a* and 13*b*. The other is the extreme tip of the whip that is the last to separate from the latch 36 on switch opening. For a particular device 30, the conductor of the whip 32 may be uniform over the length of the nonmetal rod or it may be varied to provide extra arc resistance in the key areas. Further, the conductor 50 may be of a combination of individually applied conductors.

In the above mentioned patent, various suitable conductors were disclosed including, for example, metal deposited by electroplating or vapor deposition, perhaps over a layer of conductive paint. Other examples will now be described.

The conductor 50 of FIGS. 2A, 2B and 3 can, for example, be a layer applied as a metal foil or a metal sheath. A metal foil can be wrapped about the outer rod surface, e.g., by wrapping a tape of a metal foil with adhesive backing in one or more layers. Suitable copper tapes, for example, are readily available.

A metal sheath for the conductor 50 could be formed (e.g., into tubular form) before being fitted on the rod surface. The conductors referred to need not be continuous along the length of a whip as long as there is conductive continuity. For example, a whip 32 could have a layer of metal foil over its length and have limited areas of metal sheath at the areas mentioned above where it can be desirable to have enhanced arc resistance. The metal of a sheath may be chosen for example, from conductors such as copper, aluminum, stainless steel or, for even greater arc resistance, titanium.

Figure 4:
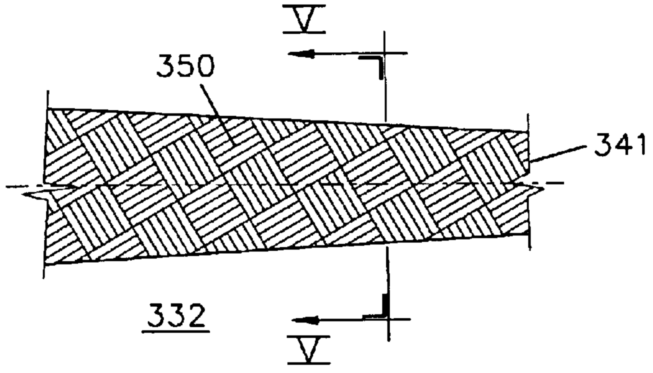
FIGS. 4 and 5 are, respectively, a partial side elevation view and a sectional view of a whip embodiment, with FIG. 5 enlarged in relation to FIG. 4.
Figure 5:
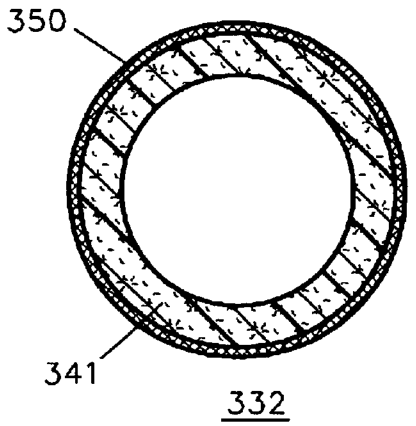

FIGS. 4 and 5 show a different form of conductor on a whip 332. The whip 332 has a nonmetal rod structure 341 (representative of a single rod or of the outer rod of a multiple rod assembly) with a conductor 350 that is (or includes) a metal braid. Tubular braid of various metals is widely available from wire and cable suppliers for such purposes as electromagnetic shielding, grounding bonds and connections to motor brushes. Such commercial products can be used for conductor 350 even though the tubular configuration is not tapered; the braid has a formability sufficient for it to fit on and adhere to a tapered rod. The rod can be put inside the braid and the braid stretched to give a tight fit on the rod. The braid ends are then twisted and, possibly, tied or clamped to be held on the rod. Braids of a wide variety of metals from highly conductive silver or copper to highly durable stainless steel or titanium, or a combination of both, can be used.

As the metal braid is stretched over the rod, openings between strands of the braid can occur exposing the surface of the rod. For some installations, where exposure to sunlight might be deleterious to the nonmetal material of the rod, the rod can have an outer surface that is not homogeneous with the inner material and is more sunlight (UV) resistant. Avoiding sunlight effect on the rod is also taken care of by the example of FIG. 6.

Figure 6:
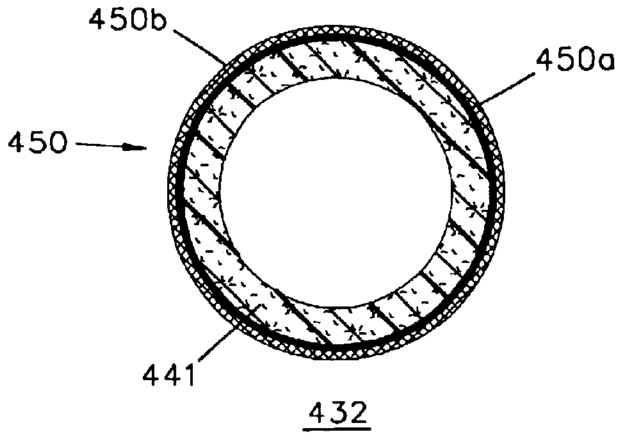
FIG. 6 is a sectional view of another whip embodiment.

FIG. 6 shows a whip 432 with a rod 441 (a single rod or the outer rod of a rod assembly) having a combination conductor 450 including a first, inner, conductor layer 450*a* over the rod surface that may be, for example, an electroplated metal (which may itself be over a conductive paint, not shown) or a wrapped foil tape and, over the first layer 450*a*, a conductive metal braid 450*b*.

Figure 7:
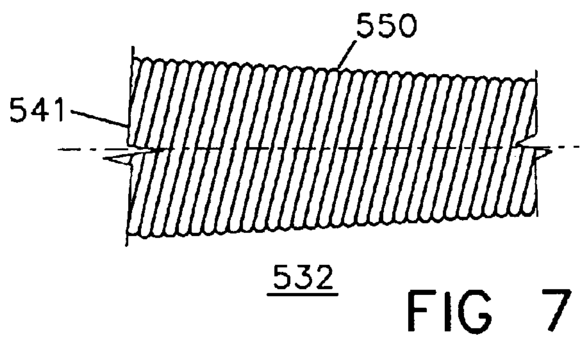
FIGS. 7, 8, 9, 10, 11, and 12 are partial side elevation views of some whip embodiments.

FIG. 7 shows a part of a whip 532 with a still different form of a conductor which is a wound wire, or wire spring, 550 over a rod 541. The wire is preferably of small diameter and is wound with immediately adjacent turns for smoother contact with a latch.

Figure 8:
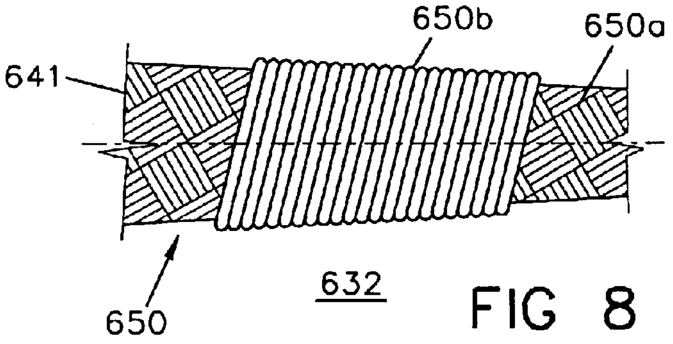

FIG. 8 shows a part of another whip 632 with a combination conductor 650 comprising first a layer of metal braid 650*a* on a rod 641 and additionally, over the braid 650*a* in a region of the whip length, a wound wire 650*b*, for example, where desired to give additional arc resistance.

Figure 9:
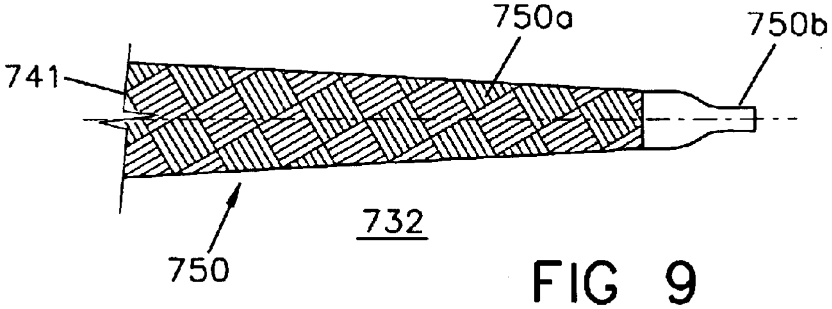

FIG. 9 shows a further example of a whip 732 which at the tip portion of a rod 741 has a conductor 750 comprising a metal braid 750*a* and, at the tip end, a metal cap or sheath 750*b* over the braid 750*a*. In this example, the cap 750*b*, which may be of a highly durable conductor such as titanium, has, in addition to the part having direct contact to the braid 750*a*, a pointed tip extending beyond the end of the rod for additional thermal mass to inhibit arc melting. (An extended portion of cap 750*b* beyond the end of the rod need not have a step change in its outer dimension from the part of the cap directly on the rod.).

From these examples, it can be seen that a conductive path on a nonmetal rod for a whip can be of various forms and combinations, including those shown and others. The example conductors particularly show how the conductive path on a nonmetal rod surface can comprise, in addition to the examples of the above patent, at least one conductor selected from the group consisting of a metal braid, a metal foil, a metal sheath, and a wound metal wire. From the variety of available conductors and rod constructions, one has choices in order to attain sufficient arc resistance, particularly in areas of greater concern, while retaining strength and flexibility for high speed separation.

Figure 10:
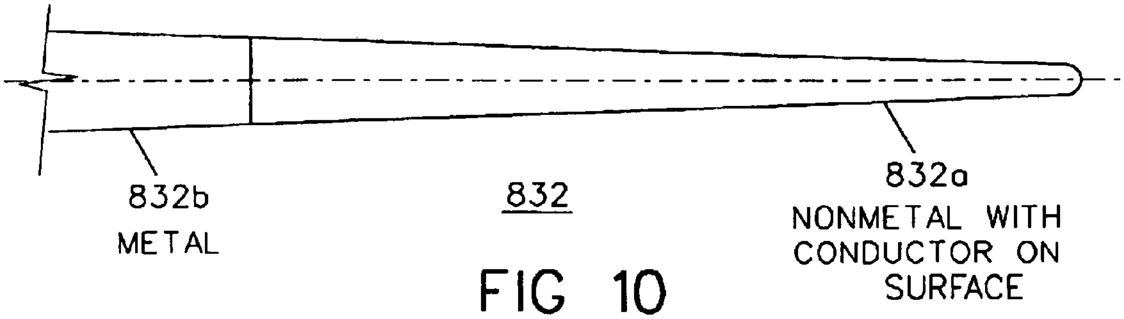

A further form of the invention is shown in FIG. 10. A whip 832 has two parts including a whip end portion 832*a* with a conductor on one or more nonmetal rods as previously discussed and a base part 832*b* that is of metal (or "all metal"; without a plastic or other nonmetal rod) of a length so it extends to a region that is where initial arcing between the whip 832 and a latch, such as latch 36 of FIG. 1A, will occur upon switch closing. The metal portion 832*b* can, for example, be like a lower portion of a metal whip of the prior art that is joined with the whip end 832*a* a short distance beyond the switch closing arcing area. The whip 832 can achieve higher speed separation from a latch by the tip portion 832*a* than a conventional whip that is all metal over its entire length, while enduring initial arcing during closing just as well as a conventional all metal whip. Higher speeds can result from a combination of the lower weight characteristics of the nonmetal portion 832*a* and the higher acceleration of the portion 832*a* by the spring force of the metal portion 832*b*. (Sometimes prior art metal quick break whips were arranged in a combination with a coiled accelerator spring to try to get higher speed separation. That is not considered necessary in practicing the present invention but such a device may be used if desired.) (To avoid undue wordiness, reference to the "metal" portion of the whip or the "all metal" portion are both to be understood to mean at least "substantially all metal" or "consisting essentially of metal". Practice in the past with "metal" whips has been with 100% metal which is also preferred here for the metal portion.)

Suitable compositions for the metal part 832*b* include, for example, beryllium-copper, stainless steel, and others used in prior metal whips. Generally, metal part 832*b* need not be solid; it could be tubular but solid metal rods, either tapered or of uniform cross section are often more readily available and less expensive.

Figure 11:
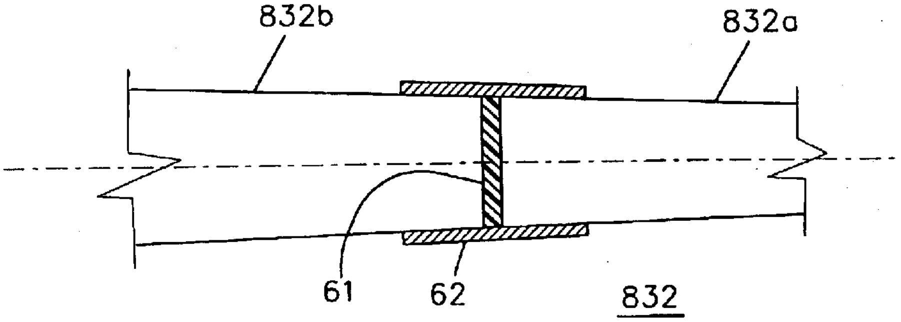
Figure 12:
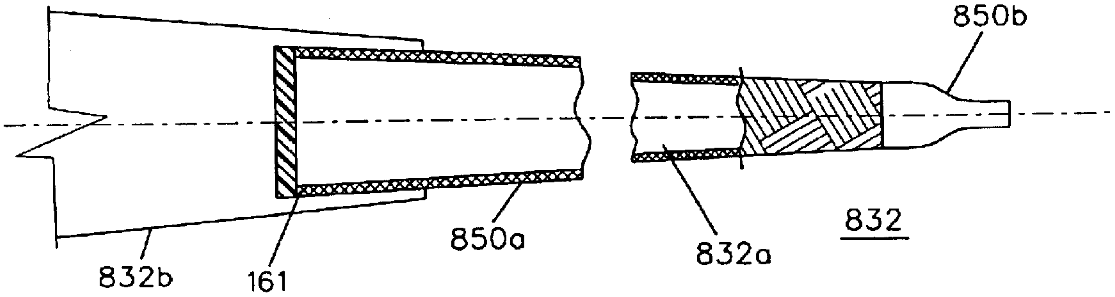

FIGS. 11 and 12 show examples of joints between parts 832*a* and 832*b* of a whip 832.

In FIG. 11 the opposing ends of the two parts 832*a* and 832*b* are attached by an adhesive layer 61, e.g., a conductive epoxy resin, and a formed metal conductor such as a metal sheath 62 is applied tightly over the ends of the two parts and the adhesive layer. The sheath 62 can, for example, be performed with a taper to tightly connect the two parts of the whip or can be crimped on (e.g., when starting with an untapered tube for the sheath).

In the example of FIG. 12, the end of the metal whip part 832*b* has an axial bore or socket into which the blunt end of the whip part 832*a* is inserted and bonded, such as by an adhesive layer 161. In this example, it is also shown that the nonmetal whip part 832*a* has a metal braid conductor 850*a* over its length that contacts both the metal of whip part 832*b* and a cap 850*b* at the extremity of part 850*a*. The bore wall material of whip portion 832*b* is shown crimped into close contact with the braid 850*a* securely attaching the two parts together.

Examples such as are shown in FIGS. 11 and 12 for joints between whip parts 832*a* and 832*b* can be smoothed by machining to run smoothly against a latch. However, a small step in the whip geometry is acceptable.

Figure 13:
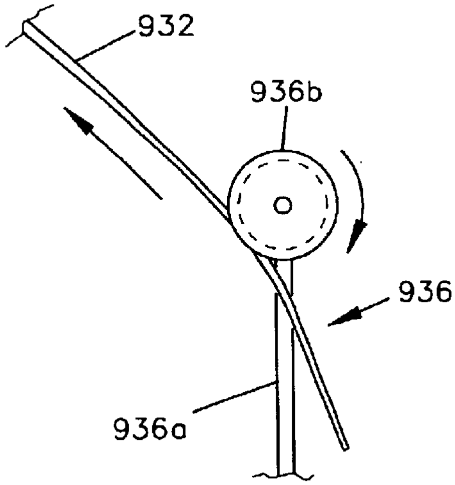
FIG. 13 is a partial elevation view of a whip and latch of an arc extinguishing device.

An example of a further variation or optional feature for a "quick break whip" type of arc extinguishing device is shown in FIG. 13. This shows a whip 932 in relation to a part of a latch 936. In this generalized view, the latch 936 comprises a conductive support, e.g., a rod 936*a* in conductive contact with a switch contact, such as shown for latch 36 in FIG. 1A. The rod 936*a* has a rotatable conductive wheel 936*b* mounted on it, such as by a conductive pin on the center of the wheel that makes electrical connection between the wheel and the rod 936*a*. In the position shown in FIG. 13, the whip 932 is in motion, as shown by the arrow along its length, as a contact arm, such as arm 12*a* of FIG. 1A or 1B, moves to its full open position. During the motion of the whip 932 it runs along the circumference of the latch wheel 936*b* (e.g., within a circumferential groove as shown by the dashed line) and the wheel rotates, as shown by the arrow near its rim.

An arrangement like that of FIG. 13, which may be applied to quick break whip apparatus with whips of any structure, can help improve whip wear life, as well as reduce the necessary operative force of a switch opening mechanism. The rolling surface of the wheel 936*b* can reduce the drag force or friction present when a quick break whip 932 begins to cock or charge as a switch begins to open. The wheel surface can thus reduce sliding wear on the whip 932 so that a thinner, lighter form of conductive path can last longer.

Embodiments such as FIG. 13 with a wheel 936*b* on the latch rod 936 can be arranged so that, on switch opening, the whip 932 stays in contact with the latch 936*a*, as it is in the switch closed position, for an initial part of the switch arm movement, such as represented in the first phantom view of FIG. 1B. Subsequently, such as in the second phantom view of FIG. 1B, if a wheel is provided on the latch 36, the whip has transferred from the rod 936*a* to the wheel 936*b* with which it stays in contact until the whip releases from the latch. It is preferable to arrange the whip and latch (with or without a wheel) with geometry so they have substantially continuous contact from the stationary position to the final release. For example, if the whip were to bounce or have oscillating contact with the latch, additional arcing is likely to occur imposing more severe duty on the conductor along the length of the whip.

The wheel 936*b* can be of a metal such as brass or copper. Also, carbon can be used for lubricity and added life to the wearing surfaceof the whip.

Figure 14A:
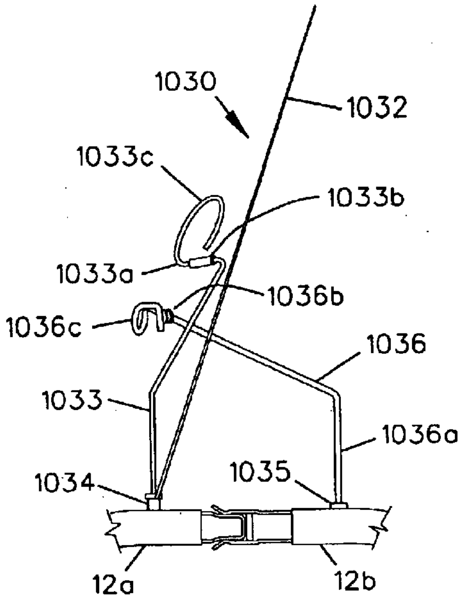
FIG. 14A is a front elevation view, partly broken away, of a switch with an arc extinguishing device.
Figure 14B:
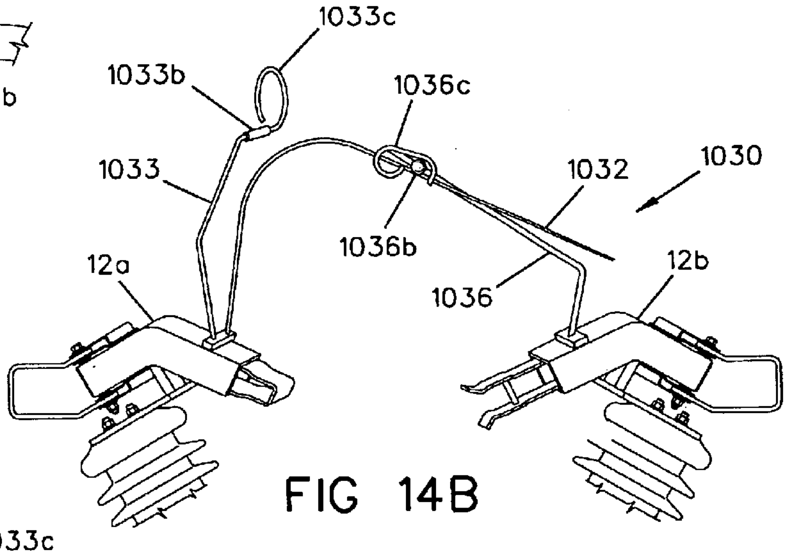
FIGS. 14B and 14C show the switch of FIG. 14A at different stages of a switch opening operation.
Figure 14C:
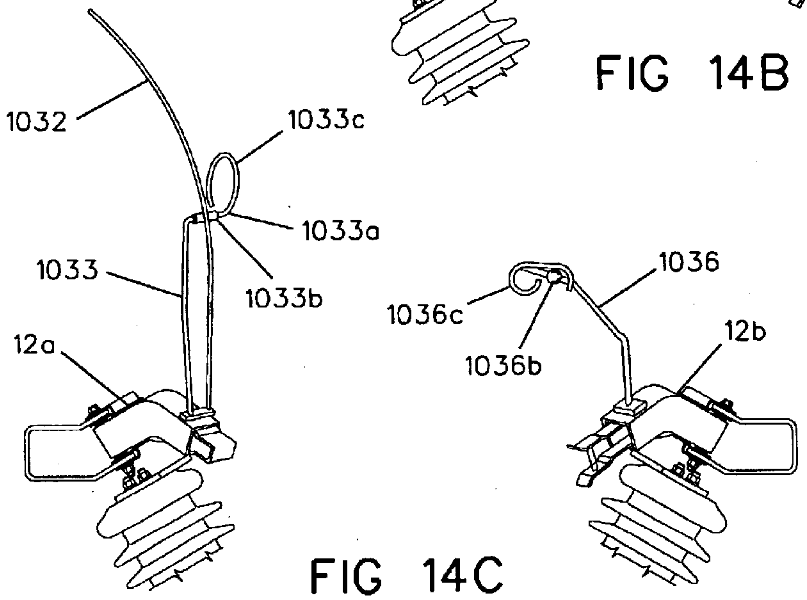

FIGS. 14A, 14B and 14C show a further example of an arc extinguishing device 1030. FIG. 14A is in closed switch position (e.g., contacts mounted on contact arms 12*a* and 12*b* of switch 10 of FIG. 1A are closed. FIGS. 14B and 14C show two positions the elements take during an opening operation.

The device 1030 includes a whip 1032, that is of some form of the previously discussed whips, a latch 1036, and an additional part referred to here as a bumper rod 1033.

The latch 1036 is generally similar to the latch 36 of FIG. 1A but with the addition of a wheel similar to that of FIG. 13. It has a latch rod 1036*a* that is attached at its lower end to the contact arm 12*b* by an attachment 1035. At the extremity of the rod 1036*a* away from the contact arm, the rod has a loop 1036*c* that can be like or similar to configurations of latch rods of prior art devices. The loop 1036*c*, particularly at the left, helps to reduce the voltage stress that may occur when the switch is opened. The surface of the loop 1036*c* is where initial contact with the whip 1032 occurs upon switch closing and the right portion of the loop 1036*c* provides a camming surface so the whip slides along the surface onto the surface of a straight portion of the rod 1036*a* bypassing the wheel 1036*b* as the switch closes.

The bumper rod 1033 is an example of another element in an arc extinguishing device 1030 for a center break switch. In this example, bumper rod 1033 is substantially rigid like the latch rod 1036*a* (i.e., compared to the whip 1032) and is attached to the contact arm 12*a* by an attachment 1034 that can be the same location as the attachment for the whip 1032. The rod 1033 extends up from the arm 12*a*, past the location where the whip 1032 and the latch 1036 contact each other, to a laterally extending portion 1033*a* with a bumper 1033*b* on it following which there is a loop 1033*c* of the rod.

The loop 1033*c* of the rod 1033 is to reduce voltage stress. The bumper 1033*b* is located so that after an opening of the switch, and the tip of the whip 1032 has released from the latch 1036, the whip's motion away from the latch is limited in magnitude by the bumper (FIG. 14C). When the whip strikes the bumper, mechanical energy is dissipated from the whip so it has less chance of rebounding within an arcing distance from the latch. Also, the bumper 1033*b* can be a resilient material such as rubber that absorbs the force of the whip striking it. This further helps dampen any rebound force that could cause an arc restrike and also limits any shock to the whip 1032 that could damage it.

The latch 1036 of FIG. 14A has a wheel 1036*b* secured to the rod 1036*a* a short distance below the loop 1036*c*. As the switch arms 12*a* and 12*b* open, the whip 1032 makes sliding conductive engagement with the latch rod 1036*a*. After some movement, the whip 1032 transitions from the latch rod 1036*a* to the wheel 1036*b* (shown in FIG. 14B) and the relation described in connection with FIG. 13 occurs.

As the switch recloses from its fully open position (not shown), the whip and latch come together and make contact before the main switch contacts meet. First the whip 1032 meets the loop 1036*c* of the latch. The whip proceeds to slide around the surface of the loop until it passes onto the rod 1036*a*. It is not necessary for the wheel 1035 1036*b* to play a role in the reclosing process; it should be in a position to perform its role in switch opening and where it does not hold up or interfere with the travel of the whip between the loop 1036*c* and the rod 1036*a* during switch closing.

Where a two part whip 832 like those of FIG. 10, 11, or 12 is used in a device 1030 like that of FIG. 14A, it is advantageous to have the metal part 832*b* of the whip located so it is where the whip is in contact with the latch rod 1036*a* upon initial opening of the switch contacts. Likewise, it is advantageous to have the metal part 832*b* be the whip part that is the first to contact the latch at the loop 1036*c* during switch reclosing. That takes advantage of the durability and arc resistance of the all metal part 832*b* while the lightweight nonmetal tip portion 832*a* of the whip, with its conductive path, can perform its role in speeding separation upon switch opening.

From the foregoing it is believed innovative whips, and whip and latch combinations, for arc extinguishing devices can be made in forms including those with high speed operation capable of interrupting large currents at high voltage (e.g., up to at least 138 kV). Current levels at least twice that of those interrupted by prior all metal whips can be achieved. This improved performance, along with long life, can be provided relatively economically, i.e., with no substantially greater cost of manufacture than prior art devices. Typically, in the past when all metal whips have been inadequate for a particular application, it has been necessary to avoid use of an air break switch with a quick break whip and instead use a much more costly vacuum switch.

One of the advantages of the apparatus innovations presented is that they can be applied substantially as straightforward replacements for prior whips and latches and achieve improved results. However, these innovations also open up new opportunities for arc extinguishing devices that are modified to take even greater advantage of the increased unit strength and flexibility of the improved whips and latch.

The illustrated, and presently preferred, embodiments involve use of tapered whip elements. However, non-tapered elements can also be suitable in embodiments such as those otherwise like FIGS. 3 through 12. Also, the embodiments show whip elements of circular cross-section but other shapes are intended to be included as well. Further, it is to be recognized that some embodiments, e.g, FIGS. 4 through 12, can be practiced with a solid, rather than hollow, non-metal portion. Similarly, a metal portion of a whip, such as portion 832*b* of FIG. 10 may, broadly speaking, be solid or hollow.

In embodiments such as FIGS. 10, 11, and 12 a preference exists for having the metal portion 832*b* extend at least to the arcing regions on initial switch closing and opening but that is not intended to preclude embodiments in which the metal portion of a two-part whip only extends from the base of the whip to a distance short of that of those arcing regions. In such alternative embodiments, the metal portion can still contribute to high speed separation by attaining higher spring force.

In the description of various embodiments, for example, FIG. 5, reference is made to the fact a rod 341 may be either a single nonmetal rod or an outer rod of a rod assembly such as assembly 40 of FIG. 2A. It should be recognized that where a single nonmetal rod is used it may, if desired, have a greater wall thickness than the described rods such as rod 41, and alternatively, may be solid.

The embodiments disclosed are merely some examples of the various ways in which the invention can be practiced.

What is claimed is:

1. An air break switch comprising:

first and second interengaging switch contacts, each conducively joined with respective contact arms, and a switch operating mechanism for opening and closing the switch contacts by relative movement of the contact arms;

an arc extinguishing whip and a latch conducively connected with respective ones of the first and second switch contacts;

the whip having a first, metal, portion and a second, nonmetallic portion, the first whip portion having an attachment to a first contact arm, the second whip portion comprising a tapered flexible rod of nonmetallic material with a tip remote from the first whip portion and a blunt end joined with the first whip portion, the second whip portion having, on the exterior of the nonmetallic rod, a continuous conductive path along its length from the first whip portion to the tip of the second whip portion;

the latch comprising a conductive rod with an end attached to the second contact arm;

the whip and the latch being attached with the respective contact arms in an arrangement for making sliding conductive engagement between the whip and the latch during an opening operation of the switch operating mechanism during which flexing of the whip occurs until separation of the whip and latch and the whip springs away from the latch.

2. The switch of claim 1 where:

the second, nonmetallic, portion of the whip comprises a plurality of hollow, tapered flexible rods of nonmetallic material in a rod assembly having a first, outer, rod with the exterior conductive path and also having one or more successive rods disposed concentrically within the first, outer, rod; and the rod assembly having, at the blunt end thereof, blunt ends of all of the plurality of rods joined together in a fixed relation with the first whip portion.

3. The switch of claim 2 where:

the nonmetallic material of each of the nonmetallic rods of the rod assembly comprises fiber reinforced plastic material.

4. The switch of claim 1 where:

the conductive path on the second whip portion includes a tubular metal braid; and the latch comprises a conductive wheel with a circumferential groove supported by the conductive rod of the latch where the whip and latch arrangement places the conductive rod of the latch in direct contact with the first whip portion upon initial switch opening and upon switch closing, and the tubular metal braid on the second whip portion makes direct conductive engagement with the latch at the circumferential groove of the wheel during a part of a switch opening operation subsequent to initial switch opening.

5. The switch of claim 3 where:

the conductive path on the second whip portion includes a tubular metal braid;

the latch comprises a conductive wheel with a circumferential groove supported by the conductive rod of the latch where the whip and latch arrangement places the conductive rod of the latch in direct contact with the first whip portion upon initial switch opening and upon switch closing, and the tubular metal braid on the second whip portion makes direct conductive engagement with the latch at the circumferential groove of the wheel during a part of a switch opening operation subsequent to initial switch opening;

the blunt end of the second whip portion is secured within a bore at an outer end of the first whip portion, with the bore having a wall in close contact with the metal braid on the exterior of the second whip portion; and the second whip portion further includes a metal cap at the tip end in conductive contact with the metal braid.

6. The switch of claim 5 where:

the plurality of rods in the rod assembly have blunt ends with physical contact between adjacent rods and tip ends with a gap between adjacent rods;

the conductive wheel of the latch is located proximate an extremity of the conductive rod of the latch; and a bumper rod is attached to and extends from the first contact arm with a bumper on the bumper rod located to limit motion of the whip away from the latch following whip and latch separation and dampen whip rebound force.

7. The switch of claim 1 where:

the whip and latch arrangement places the conductive rod of the latch in direct contact with the second whip portion upon initial switch opening and closing.

8. The switch of claim 1 where:

the latch comprises a conductive wheel with a circumferential groove and the whip and latch arrangement places the conductive rod of the latch in direct contact with the first whip portion upon initial switch opening and upon switch closing, and the conductive path on the second whip portion makes direct conductive engagement with the latch at the circumferential groove of the wheel during a part of a switch opening operation subsequent to initial switch opening.

9. The switch of claim 1 where:

the first and second whip portions are conducively joined at a joint at which the blunt end of the second whip portion and the conductive path thereof are secured within a metal sheath.

10. The switch of claim 1 where:

the nonmetallic material of the second whip portion comprises fiber reinforced plastic material.

11. The switch of claim 1 where:

the conductive path on the second whip portion comprises at least one conductor selected from the group consisting of a metal braid, a metal foil, a metal sheath, and a metal wire.

12. The switch of clam 1 where:

the first and second whip portions are conducively joined at a joint at which the blunt end of the second whip portion and the conductive path thereof are secured within a metal sheath;

the nonmetallic material of the second whip portion comprises fiber reinforced plastic material; and the conductive path on the second whip portion comprises at least one conductor selected from the group consisting of a metal braid, a metal foil, a metal sheath, and a metal wire.

13. The switch of claim 12 where:

the respective contact arms to which the switch contacts are conducively joined are arranged with the switch operating mechanism for movement of both of the contact arms in the opening and closing of the switch contacts.

* * * * *

UNITED STATES PATENT AND TRADEMARK OFFICE

CERTIFICATE OF CORRECTION

PATENT NO. : 6,762,385 B1 
DATED : July 13, 2004
INVENTOR(S) : Kowalik et al.

It is certified that error appears in the above-identified patent and that said Letters Patent is hereby corrected as shown below:

<u>Column 2</u>,
Line 2, change “from” to -- form --.

<u>Column 3</u>,
Line 56, change “conducively” to -- conductively --.

<u>Column 4</u>,
Line 34, change “conducively” to -- conductively --.

<u>Column 5</u>,
Line 67, change “750%” to -- 75% --.

<u>Column 9</u>,
Line 31, change “surfaceof” to -- surface of --.

<u>Column 10</u>,
Line 23, delete “1035”.

<u>Column 11</u>,
Line 27, change “ducively” to -- ductively --.
Line 31, change “conducively” to -- conductively --.

<u>Column 12</u>,
Line 61, change “conducively” to -- conductively --.

<u>Column 13</u>,
Line 7, change “conducively” to -- conductively --.

Signed and Sealed this

Twenty-second Day of February, 2005

JON W. DUDAS
*Director of the United States Patent and Trademark Office*